(12) United States Patent
Soulhi et al.

(10) Patent No.: US 8,666,345 B2
(45) Date of Patent: Mar. 4, 2014

(54) FILTER FOR AN INDOOR CELLULAR SYSTEM

(75) Inventors: Said Soulhi, Saint Constant (CA); Taoufiq Abouzid, Riyadh (SA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 79 days.

(21) Appl. No.: 13/265,295

(22) PCT Filed: Apr. 9, 2009

(86) PCT No.: PCT/EP2009/054293
§ 371 (c)(1),
(2), (4) Date: Dec. 30, 2011

(87) PCT Pub. No.: WO2010/115468
PCT Pub. Date: Oct. 14, 2010

(65) Prior Publication Data
US 2012/0094624 A1  Apr. 19, 2012

(51) Int. Cl.
*H04B 17/00* (2006.01)

(52) U.S. Cl.
USPC ............... 455/226.2; 455/293; 455/276.1; 455/303; 455/304; 455/305

(58) Field of Classification Search
USPC ............ 455/226.2, 293, 276.1, 303, 304, 305
See application file for complete search history.

(56) References Cited

U.S. PATENT DOCUMENTS

| | | | |
|---|---|---|---|
| 5,533,011 A | 7/1996 | Dean et al. | |
| 5,912,641 A * | 6/1999 | Dietrich | 342/354 |
| 7,248,109 B2 * | 7/2007 | Burns et al. | 330/124 R |
| 7,313,113 B1 | 12/2007 | Hills et al. | |
| 8,010,116 B2 * | 8/2011 | Scheinert | 455/443 |
| 8,160,530 B2 * | 4/2012 | Corman et al. | 455/276.1 |
| 8,396,368 B2 * | 3/2013 | Tarlazzi et al. | 398/115 |
| 2009/0042593 A1 | 2/2009 | Yavuz et al. | |
| 2009/0061939 A1 | 3/2009 | Andersson et al. | |

* cited by examiner

*Primary Examiner* — Sanh Phu

(57) ABSTRACT

The invention relates to a filter (20) filtering a downlink signal of an antenna (13) of an indoor cellular system, the filter comprising a signal determining unit (24) determining a signal strength of an uplink signal received by said antenna (13), the filter adjusting a signal strength of the downlink signal of said antenna (13) in accordance with the signal strength of the uplink signal.

18 Claims, 10 Drawing Sheets

FILTER FOR AN INDOOR CELLULAR SYSTEM

This invention relates to a filter filtering a downlink signal of an antenna of an indoor cellular system and to a method for filtering the downlink signal of the antenna.

BACKGROUND

Indoor cellular systems are becoming increasingly spread as user demands for everywhere coverage are matched by the opportunity for mobile operators to offer improved services and increase traffic revenues. The owners of the building in which the indoor cellular system is provided also benefit from such a system as the value of their property and their ability to attract and retain key tenants increases.

It is estimated that two thirds of all calls are made from inside a building and with the increased demands for high data traffic capabilities there is a growing need for improved capacity and coverage from indoor users.

An in-building cellular system offloads surrounding macro sites and ensures a higher quality of service for indoor users.

One of the basic components provided in a distributed antenna system (DAS) is the power splitter, which divides the power from a radio base station for distribution to several antennas. The splitter distributes the signal equally to multiple antennas and is normally a passive component that has one input and several outputs. The splitter is a RF component which cannot amplify the input signal and splits it at the output only. By way of example in case of a 2-way splitter, the splitter splits the input signal into two equal output powers, whereas, in case of a 3- or 4-way splitter, the splitter splits the input signal in three and four equal output power signals, respectively. The 4-way splitter, by way of example, splits power fed at its input equally to each of the four antennas connected to the respective output port.

This traditional splitter does not consider the traffic load at the antennas connected to its ports so that the power will be split independently of the number of mobile stations (MS) connected to the antennas. With the current architecture of a power splitter it is not possible to optimize the power and to manage the power distribution flexibly in terms of carried traffic by each antenna. Thus a big part of the radio base basis station power is wasted in the indoor distributed antenna system.

SUMMARY

Accordingly, a need exists to be able to efficiently manage the power distribution of an indoor cellular system.

This need is met by the features of the independent claims. In the dependent claims preferred embodiments of the invention are described.

According to a first aspect of the invention, a filter filtering a downlink signal of an antenna of an indoor cellular system is provided, the filter comprising a signal determining unit determining the signal strength of an uplink signal received by said antenna. The filter adjusts the signal strength of the downlink signal of said antenna in accordance with the signal strength of the uplink signal. The filter, that may be provided in an output port of a splitter distributing power to the antennas connected to the splitter, can control the received and transmitted power from and to the antenna connected to said output port. According to the invention, the transmitted/received power is controlled in such a way that in areas where a weak traffic is noticed, the transmitted power is reduced proportionally. The signal determining unit of the filter measures the received power from the antenna. With such a filter being present at an output port of a splitter the transmitted power transmitted from a radio base station can be efficiently used in such a way that more antennas can be utilized in the indoor cellular system compared to systems known in the art without the need to increase the number of radio base stations in the same way. As a consequence a high number of antennas can be used to cover a building since the power can be intelligently split in all building areas depending on the carried traffic by each of the antennas. As a consequence less radio base stations are needed in view of the optimized power distribution, as a single radio base station can serve a larger number of antennas.

Preferably, the filter comprises an automatic load adjusting unit for automatically adjusting a load of an output port, to which said antenna is connected, in accordance with the uplink signal strength received at said output port. Based on the uplink signal strength determined by the signal determining unit, the port load of the output port is adjusted automatically. The signal determining unit may periodically update the automatic load adjusting unit with the latest measured signal strength values of the uplink signal requesting the automatic load adjusting unit to adjust the corresponding load value for the output port.

Furthermore, a decoder may be provided decoding the uplink signal before the signal determining unit determines the signal strength of the uplink signal. Additionally, a demodulator determining a type of modulation of the uplink signal may be provided that is demodulating the uplink signal before the signal determining unit determines the signal strength of the uplink signal. The uplink signal can be demodulated and decoded by the decoder and the demodulator, respectively, before the signal strength of the uplink signal is determined. When the signal determining unit has determined the signal strength after decoding and demodulation, the received uplink signal may be modulated and coded for further transmission. A modulator may be provided in the filter modulating the uplink signal after the signal determining unit has determined the signal strength of the uplink signal, a coding unit coding the uplink signal after the signal strength of the uplink signal has been determined by the signal determination unit. Preferably, the signal is first modulated and then coded, before it is further transmitted to the radio base station of the indoor cellular system.

According to another embodiment of the invention, the filter may comprise a band pass filter filtering the uplink signal before the signal determining unit can determine the signal strength of the uplink signal. The band pass filter is preferably configured in such a way that it lets only pass the frequencies used by the network operator of the indoor cellular system. The band pass filter reduces the signal processing load for the other units provided in the filter, e.g. the signal determining unit, since only the relevant uplink signals will be able to reach the decoder, the demodulator and the signal determining unit.

According to one embodiment of the invention, the signal determining unit determines the signal strength of different uplink signals received by said antenna and adds the different uplink signals to a combined uplink signal. The filter then adjusts the signal strength of the downlink signal for said antenna in accordance with the signal strength of the combined uplink signal. The signal determining unit may determine the signal strength of each uplink signal, separately, and may furthermore synchronize the different uplink signals received by the antenna before the signal strength of the combined uplink signal is determined. The strength of all signals may be summed up and considered as the periodic signal strength of the uplink signal that is also used by the automatic load adjusting unit automatically adjusting the load of the downlink signal accordingly.

The invention furthermore relates to a method for filtering the downlink signal of the antenna of the indoor cellular system, in which the signal strength of the uplink signal received by said antenna is determined and the signal strength of the downlink signal for said antenna is adjusted in accordance with the signal strength of the uplink signal. Preferably, the load of an output port, to which said antenna is connected, is adapted in accordance with the uplink signal received at said output port, when the signal strength of the downlink signal should be adjusted. Preferably, the uplink signal is decoded and demodulated before the signal strength of the uplink signal is determined, wherein the demodulation step furthermore comprises the step of determining the type of modulation applied to the uplink signal. Thus for the demodulation the modulator should know previously which type of modulation has been used by the mobile station transmitting the uplink signal to the antenna. After the signal strength of the uplink signal has been determined the signal may be again modulated and coded for further transmission. The uplink signal is modulated to meet the RF propagation requirements of the next transmission channel which may be the feeder cable. The type of modulation or the modulation method (8 PSK, QAM-16, QAM-64 etc.) could be similar to the one used by the mobile station. This is to prevent any incompatibility of the signal processing at the radio base station later on. After modulation the uplink signal may be coded in order to secure it from any undesired wiretapping attack of the signal between the splitter port and the RF component connected to this port towards the radio base station. As each uplink signal may be determined separately, the different uplink signals may be combined to a combined uplink signal, wherein the signal strength of the downlink signal for said antenna is adjusted in accordance with the signal strength of the combined uplink signal.

The invention furthermore relates to a splitter distributing power to a plurality of antennas of an indoor cellular network, the splitter comprising an input port receiving power and a plurality of output ports to which said plurals of antennas are connected and to which the received power is distributed. The splitter comprises, for at least one of the output ports, a filter as described in detail above. Preferably, the splitter comprises a filter as discussed above for each of its output ports.

BRIEF DESCRIPTION OF THE DRAWINGS

The invention and further objectives and advantages thereof will best be understood by reference to the following detailed description of illustrative embodiments when read in conjunction with the accompanying drawings, wherein.

DETAILED DESCRIPTION

Figure 1:
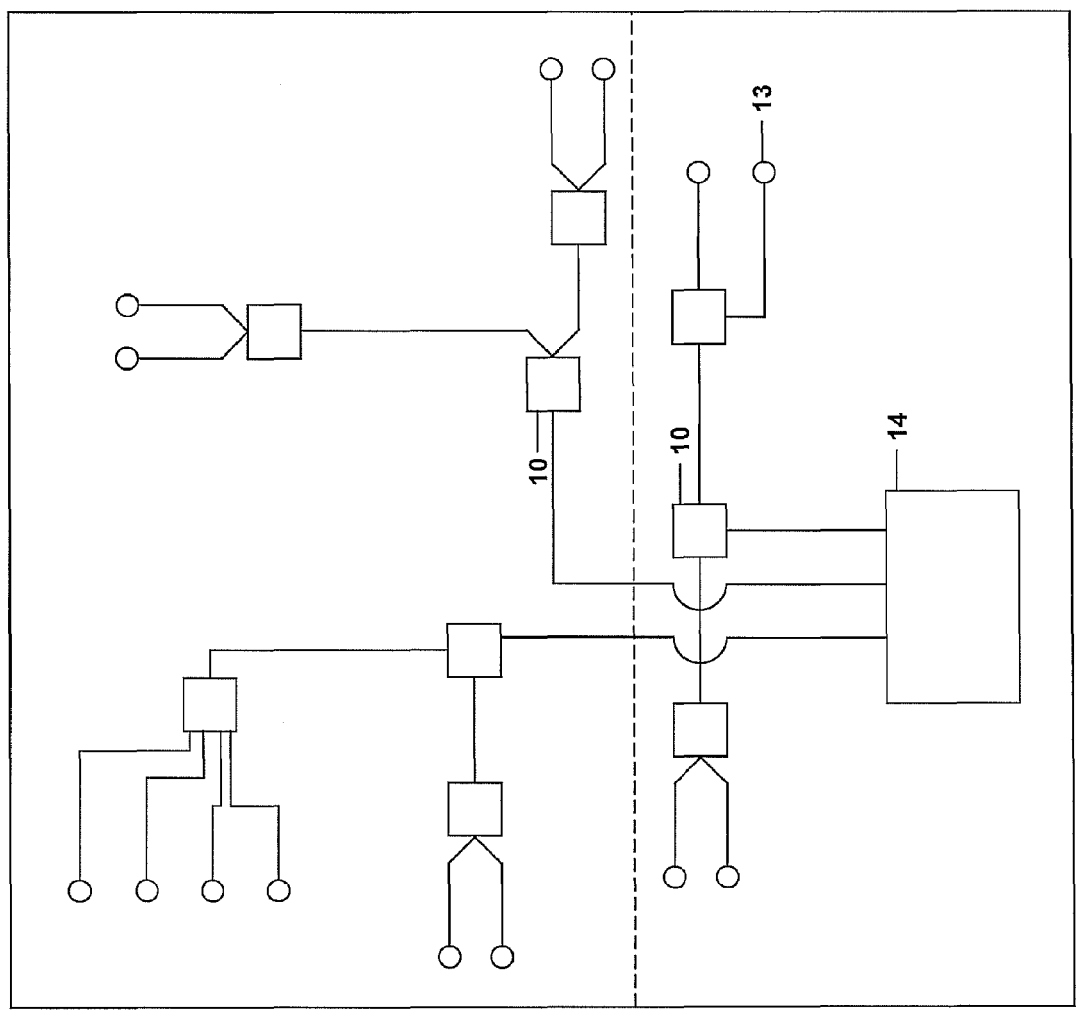
FIG. 1 shows an example of an indoor distributed antenna system.

In FIG. 1 an exemplary embodiment of an distributed antenna system of an indoor cellular system is shown. The system shown distributes power from a radio base station provided in an equipment room 14 to different antennas 13 provided in different rooms of the building. By way of example, the building may comprise different levels such as a basement level shown in the part of FIG. 1 below the dashed line whereas the part of the figure above the dashed line may be the ground level. However, it should be understood that many more levels may be provided. In the system furthermore power splitters 10 are shown distributing the power from the radio base station to the different antennas. As shown in the example of FIG. 1 a splitter 10 may be directly connected to a plurality of antennas at its output ports, however, the splitter may also be connected to another splitter resulting in a cascaded arrangement of splitters. As can be furthermore seen from FIG. 1 a different number of antennas may be connected to one splitter. By way of example, the splitter may have two, three or four output ports to which the respective antennas are coupled.

Figure 2:
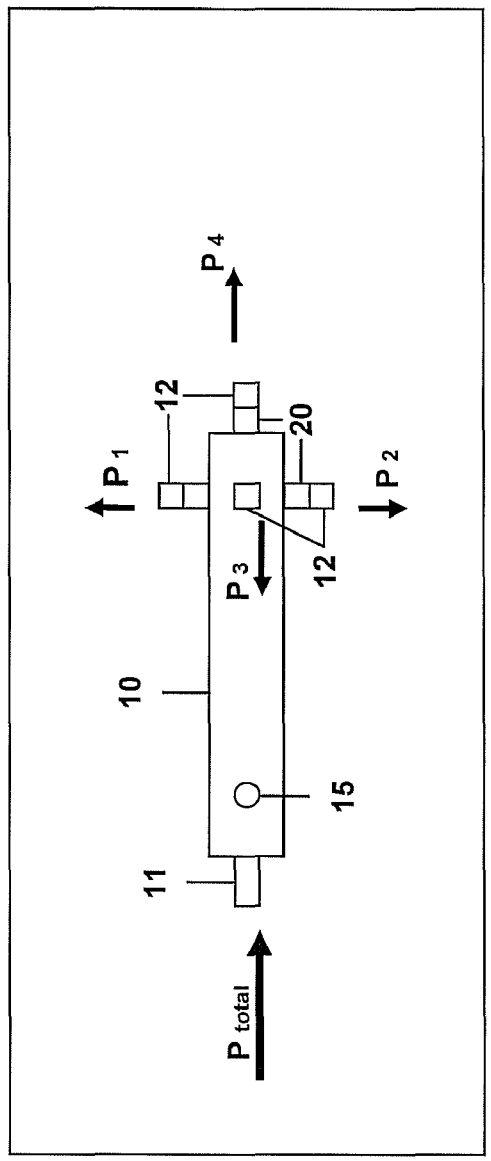
FIG. 2 shows a splitter with several output ports, each output port comprising a filter for adjusting the signal strength of the downlink signal.

As shown inter alia in FIG. 2 a splitter to comprises an input port 11 and a plurality of output ports 12. In the embodiment shown in FIG. 2 a splitter comprises four output ports 12 providing output power P1 to P4 to the different antennas (not shown). Additionally, as shown in FIG. 2 each of the output ports comprises a filter 20 allowing to variably adjust the signal strength of the downlink signal depending on the signal strength of the uplink signal. The filter 20 of each output port is able to variably adjust the load of each output port. The splitter to furthermore comprises a monitoring port 15 from where a signal, whether RF devices connected to the output ports are functioning correctly or not, is transmitted to a central control unit as will be explained in detail further below.

This is explained in further detail with reference to FIGS. 3 to 7. As shown in FIG. 4 a total power $P_{total}$ distributed to one splitter to is distributed to the four output ports, each output port containing a filter 20. By way of example, the power P1 is distributed to the first output port, the power P2 being distributed to the second output port, the power P3 being distributed to the third output port, and the power P4 being distributed to the fourth output port. As will be explained in detail later on with reference to FIG. 8 the filter determines the signal strength of an uplink signal received at the antennas connected to the different output ports.

Figure 3:
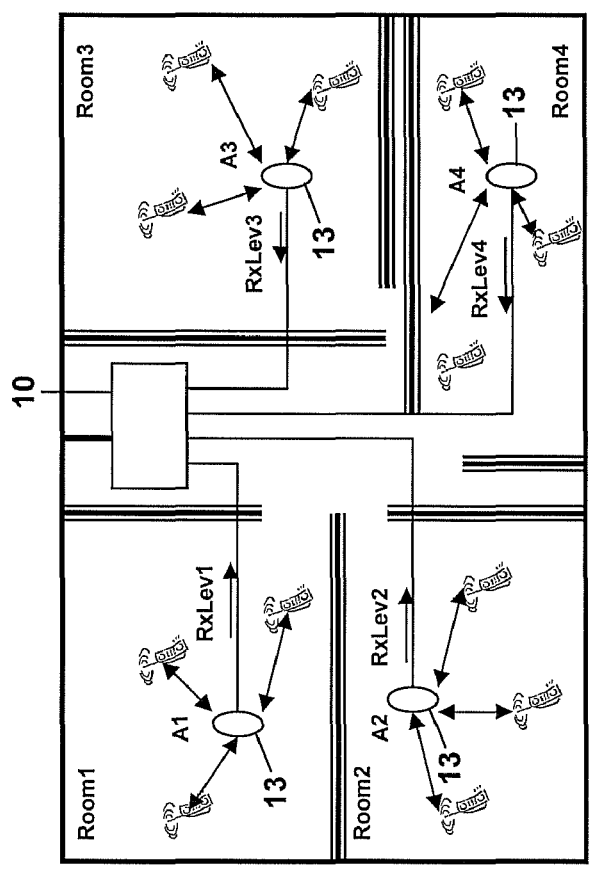
FIG. 3 shows an embodiment of an indoor cellular system on a floor plan with mobile stations in each room.
Figure 4:
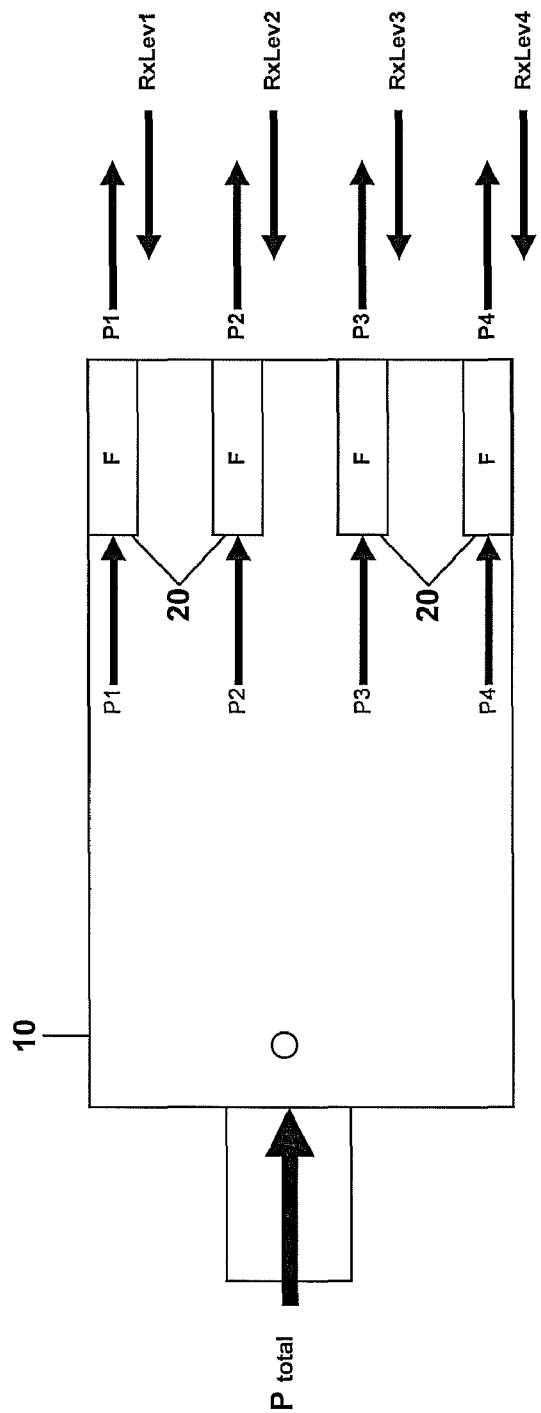
FIG. 4 shows a splitter as it could be used in the system of FIG. 3 with filters at each output port.

In FIG. 3 a first example of the indoor cellular system distributing power depending on the received uplink signal strength is shown. In this embodiment a splitter to is connected to four different antennas 13 provided in four different rooms. As can be seen the number of mobile stations provided in each room is four in all rooms. All mobile stations have line of sight with the corresponding antenna. Each filter 20 as shown in FIG. 4 determines the RxLev uplink signal strength sent by all mobile stations in the different rooms and let pass the proportional Tx signal/signal power to the mobile station.

Assuming that all antennas are in the dedicated mode so that each mobile station sends RxLev power to the antenna. In the embodiment shown in FIG. 3 this means that the total RxLev at each antenna is the same. Thus RxLev1=RxLev2=RxLev3=RxLev4. As a consequence, the power distributed to each of the filters provided in the different output ports is also the same $P_{total}$=P1+P2+P3+P4 with P1=P2=P3=P4.

Figure 5:
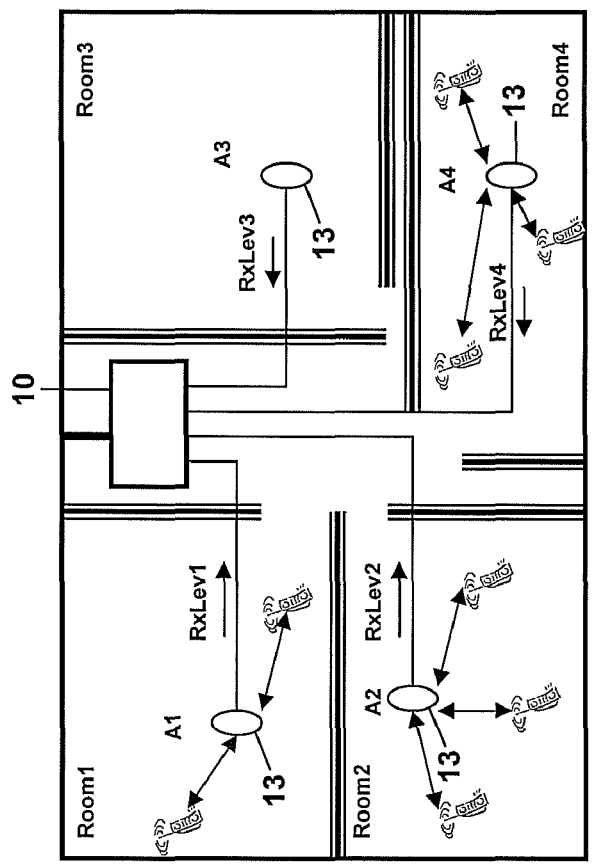
FIG. 5 shows another embodiment of a distributed antenna indoor system with different traffic load in different rooms.
Figure 6:
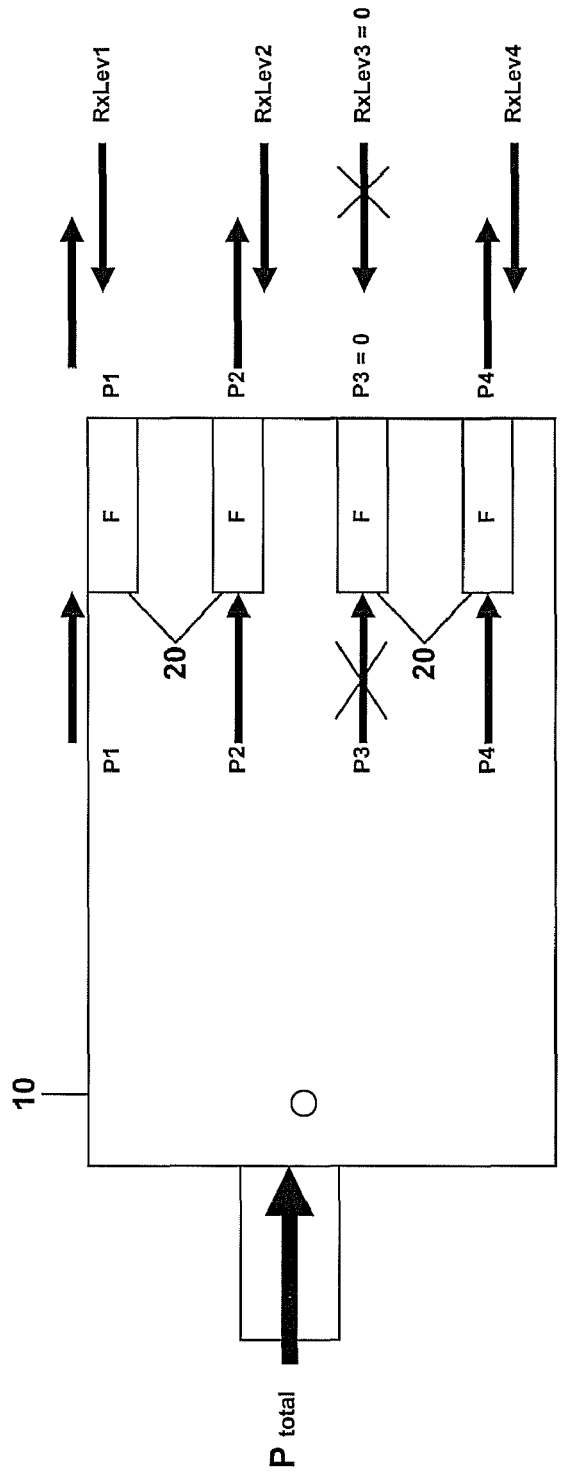
FIG. 6 shows the distribution of the power and the splitter in the embodiment shown in FIG. 5.

As shown in FIG. 5 the situation may occur that no mobile station is provided in room 3, whereas three mobile are present in rooms 2 and 4, whereas two mobile stations are present in room 1. Again each filter measures the RxLev uplink signal strength sent by all mobile stations in each room and let pass the proportional Tx signal or signal power to the mobile stations. With the number of mobile stations being present as shown in FIG. 5 the uplink signal strength of room 4 will correspond to the uplink signal strength of room 2. The uplink signal strength of room 1 will be smaller than the uplink signal strength of room 2 and room 4, whereas no uplink signal strength will be detected at the antenna present in room 3. The downlink signal for each antenna will be adapted in accordance with the received uplink signal strength. Thus the highest power will be fed to the antenna present in rooms 2 and 4, whereas less power is transmitted to room 1 via the filter present at the output port, to which the antenna for room 1 is connected. Even though the distributed power P3 is shown to be crossed out in the embodiment shown in FIG. 6, it should be understood that a minimum power may be transmitted from the radio base station to this antenna. The Tx power in the downlink is proportional to the Rx-Lev. Rx-Lev will not be exactly zero, since there is still a small uplink signal received by the antenna, e.g. from mobile stations in the other rooms, so that RxLev3 is not completely zero but is a very low value.

Figure 7:
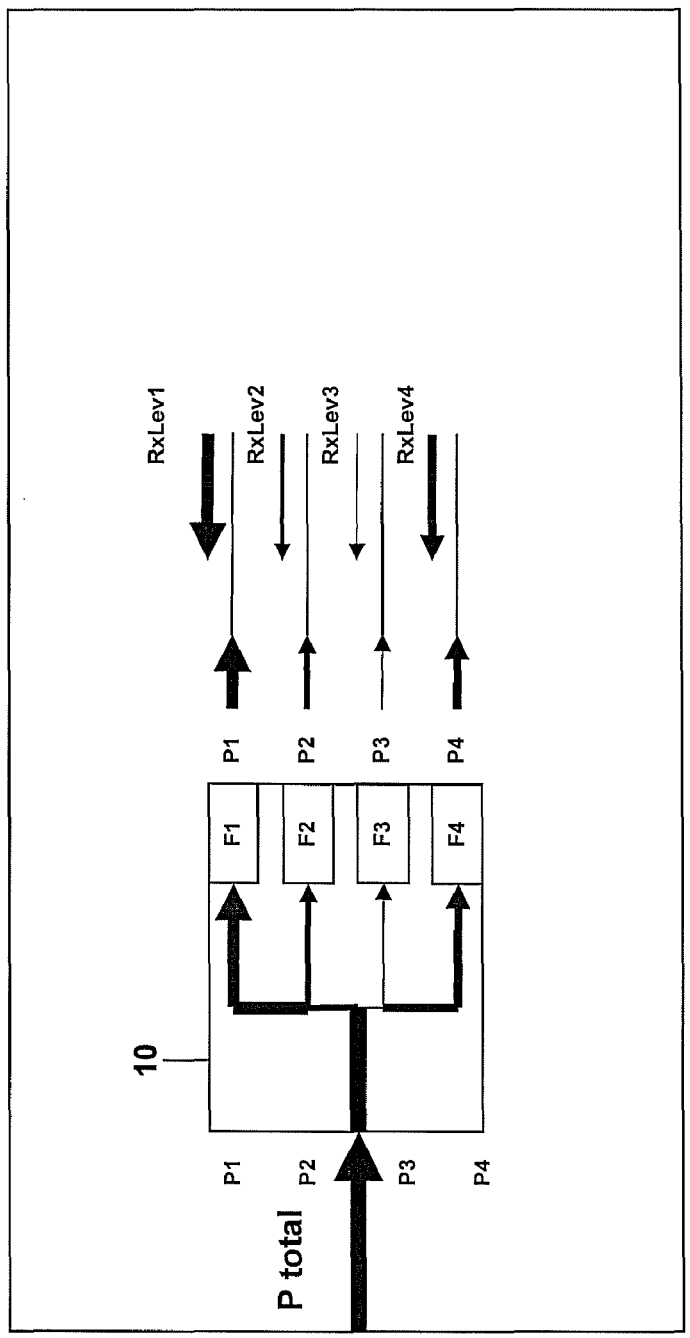
FIG. 7 shows another embodiment of a splitter distributing power, to each of its output ports.

Another embodiment for power distribution is shown in FIG. 7. In this embodiment the received uplink signal strength RxLev3 received at filter F3 is lower than the uplink signal strength RxLev2 received at filter F2, which is lower than the uplink signal strength RxLev4 received at filter F4. The strongest uplink signal strength is received at filter F1 by RxLev1. The distribution of the total power $P_{total}$ distributed to the different output ports by the filters is indicated by the different arrows having a thickness corresponding to the signal strength received at the corresponding input port. As will be explained in detail with connection to FIG. 8 the filter adjusts the load of the corresponding output ports. By way of example, in case the RxLev signal is weak, the port load will be adjusted too low, by way of example approximately 5 Ohm or less. In this case the reflection factor is approximately R=0.82. If the RxLev received at an output port is high due to more users, the port load will be adjusted to a high value, by way of example 48 Ohm or more, as in this case the reflection factor will be approximately low, e.g. R=0.02.

Figure 8:
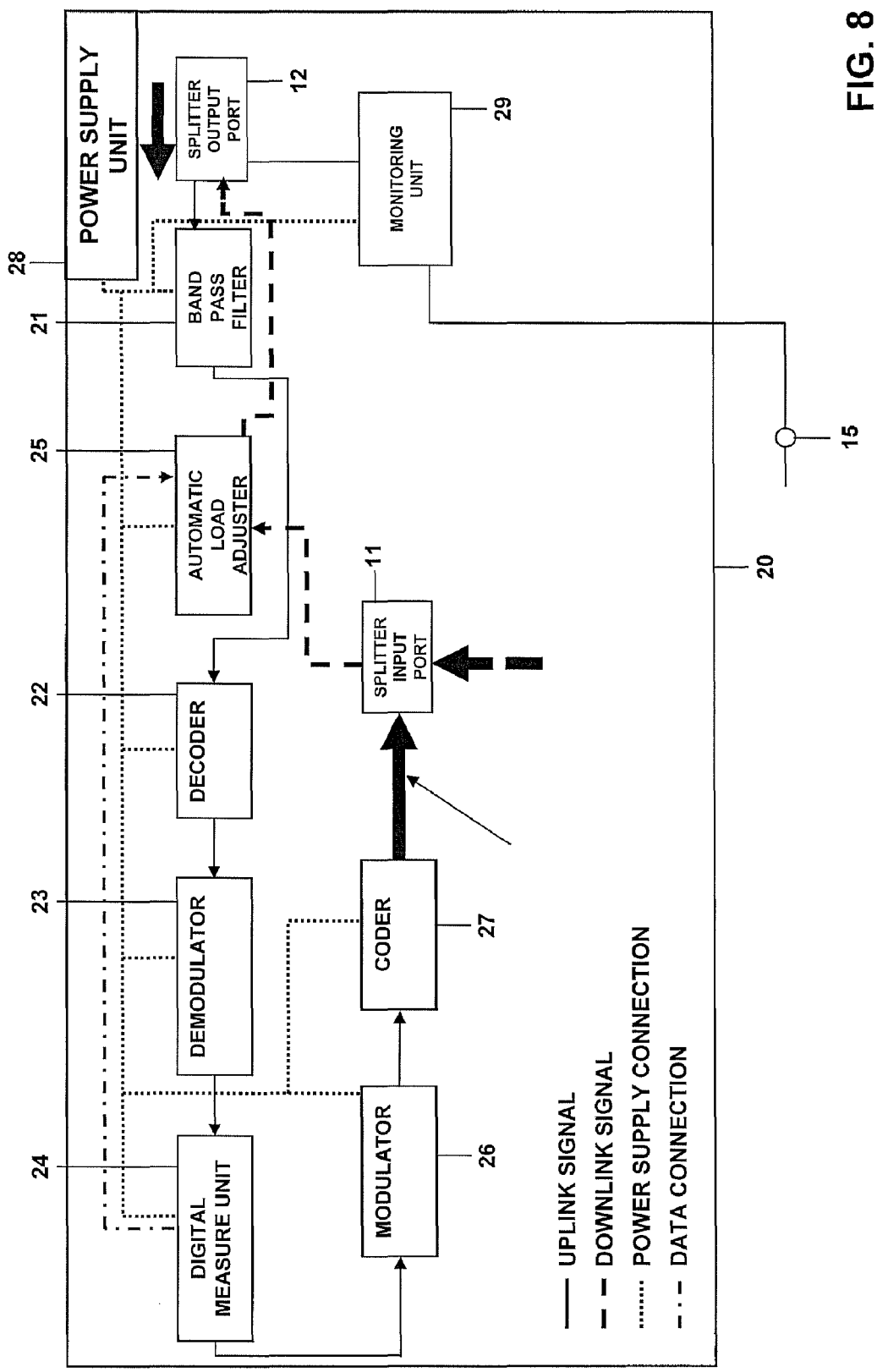
FIG. 8 shows a more detailed view of a filter filtering the downlink signal strength in accordance with the received uplink signal strength.
Figure 9:
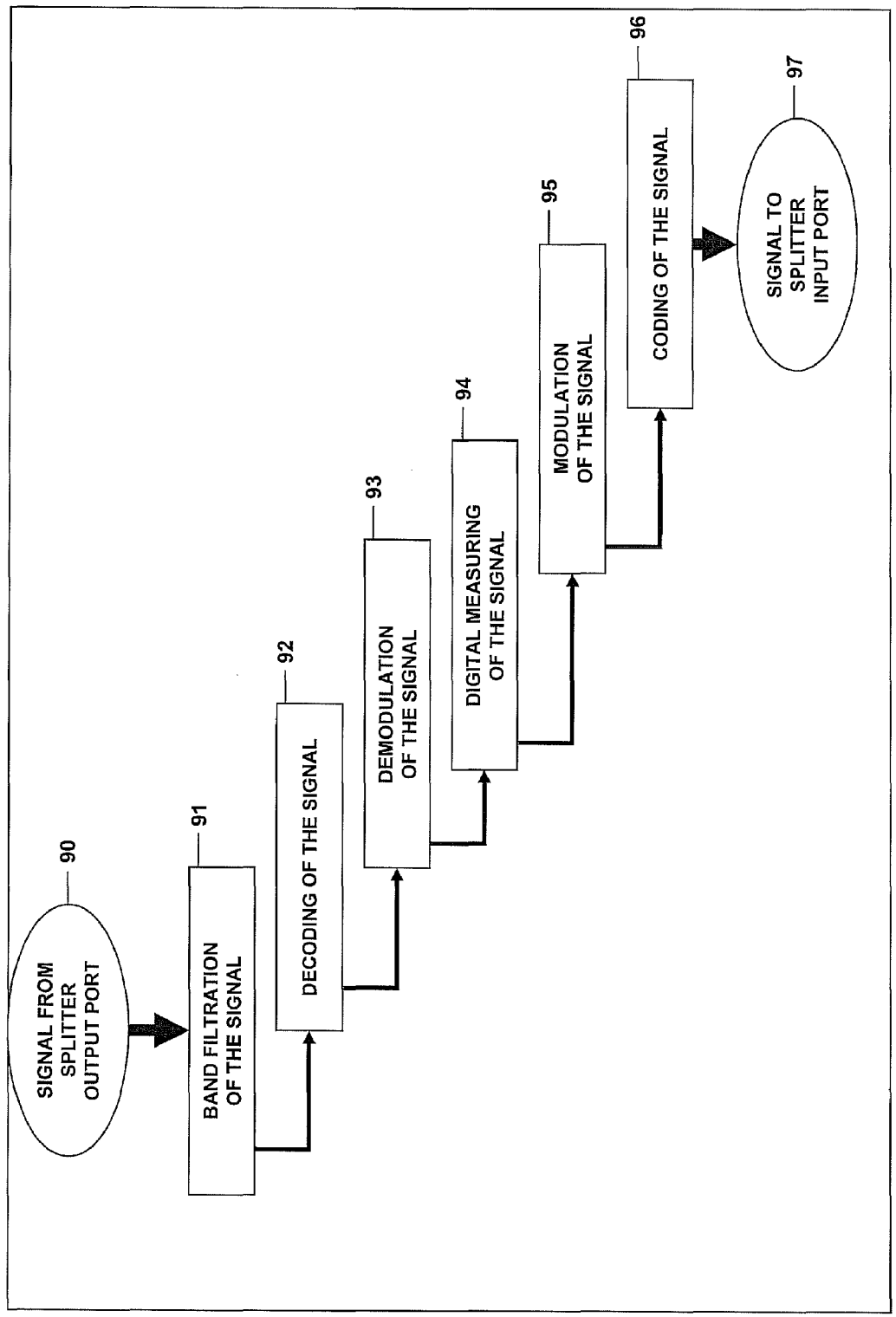
FIG. 9 shows a flow-chart comprising the steps for signal processing of the uplink signal in the filter as shown in FIG. 8.

The filter 20 that is able to automatically adjust its load is discussed in further detail with reference to FIG. 8. The uplink signal received at the splitter output port 12 is first transmitted to a band pass filter 21 the band pass filter being adapted to let pass the frequency band used by the mobile stations and to block other frequencies. Turning also to FIG. 9, where a flow-chart of the signal processing is shown, this means that the signal from the splitter output port is first transmitted to the band pass filter in step 90 and then filtered at the band pass 21 in step 91. The band pass filter signal is then supplied to a decoder 22 that decodes the filtered uplink signal. This decoder 22 helps to demodulate the uplink signal later on by a demodulator 23. The decoder 22 should know the coding system used by the mobile stations and by the radio base station. The decoder can be informed of the coding system by the mobile station in the uplink signal and by the radio base station in the downlink signal. The decoder 22 furthermore synchronizes each signal received by the different mobile stations in order to know the start and the end bits of each uplink signal. The decoding of the filtered signal corresponds to step 92 of FIG. 9. From the decoder 22 the signal is then transmitted to the demodulator 23 demodulating the uplink signal, so that it can be measured by a digital signal determining unit 24. The demodulator 23 should know previously which type of modulation has been used by the user entity in order to be able to demodulate the uplink signal correctly. The demodulation of the decoded signal corresponds to step 93 in FIG. 9. After having passed demodulator 23, the demodulated signal is then fed to the signal determining unit 24 that determines the signal strength of the uplink signal. Unit 24 digitizes each uplink signal separately and synchronizes each signal to know the start and the end bits of each received signal. Then the signal strength or signal intensity of all modulated uplink signals may be determined and the signal strength of all signals will be summed up and considered as a periodic combined signal strength of the uplink signal that is to be communicated periodically to the automatic load adjusting unit 25 as shown by the dash-dot line. Going back to FIG. 9 the step of the signal measuring is indicated in step 94. After the total signal strength has been determined in unit 24, each signal will be forwarded to the modulator 26 for further processing. The signals have in any case to be mixed with each other or added physically, since it may be difficult for the radio base station later on to assort each signal from the resulted signal mixture. The signal determining unit 24 processes each signal separately, since each signal has different carrier and a different transmission time. The modulator 26 modulates the received signal in step 95 in order to adapt the signal for further transmission, e.g. to the feeder cable. The modulation type or modulation method is preferably similar to the one used by the user entity. Any incompatibility of the signal processing at the radio base station later on should be avoided. A lack of compatibility might either lead to loosing the signal or to a degradation of the signal quality. After having left the modulator 26, the signal is fed to a coder 27, where the uplink signal is coded in step 96, in order to secure it from any unwanted wiretapping attack of the signal between the splitter port and the RF component connected to this port towards the radio base station.

The signal path of the downlink signal is shown by a thick dashed line. In the downlink signal, the downlink signal will neither be decoded nor demodulated or measured. Downlink signal will be simply forwarded inside the splitter from the splitter input port 11 to the automatic load adjusting unit 25, where it is attenuated depending on the load value adjusted and generated by the automatic load adjusting unit in dependence on the signal strength of the uplink signal. The adjusted load value should play the role of a traditional physical passive load that can be screwed to the splitter port. After attenuating the downlink signal depending on the signal strength of the combined uplink signal it is forwarded to the splitter output port 12 to propagate in the next RF components connected to this port. Furthermore, a power supply unit 28 is provided providing power to the different units via feeder cables used to connect all other DAS (Distributed Antenna System) components to each other. The power consumption will be minimized as the filter components are only processing the signal. They are not amplifying the signal so they do not need high power. The power supply can be configured in the same way as a power supply supplying power to the radio unit over CATV cables or as it is used in a WLAN access point power over Ethernet cable.

Figure 10:
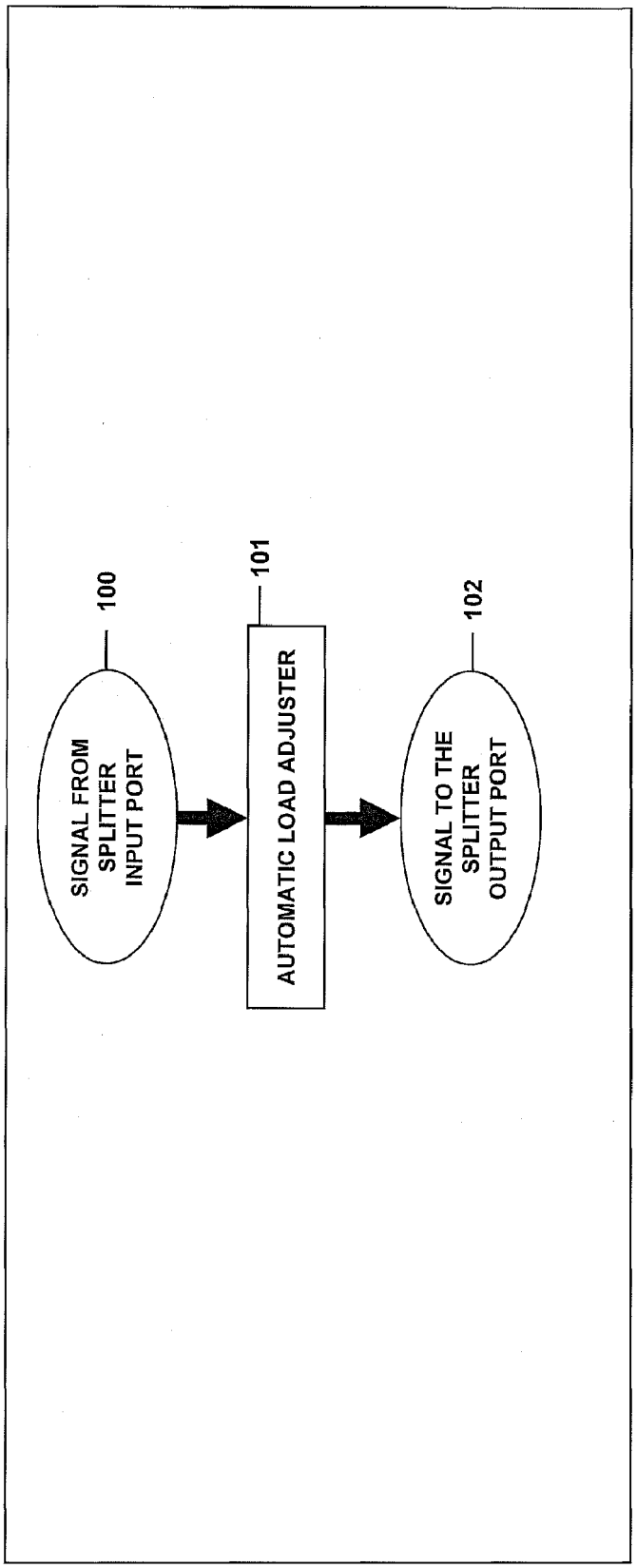
FIG. 10 shows a flow-chart of the signal processing of the downlink signal.

The signal path of the downlink signal is summarized in FIG. 10 the signal being provided to the signal input port in step 100 from where it is fed to the automatic load adjusting unit, where the load is adjusted in step 101, before the signal is fed to the splitter output port in step 102. Furthermore, a monitoring unit 29 may be provided which is used to monitor the RF components connected to the output ports of the filter 20. As discussed above the splitter should be able to balance the power between its output ports depending on the carried traffic by each antenna connected to the different output ports. Furthermore, the splitter should be able to monitor each of the output ports and periodically check if the RF components, such as other splitters, feeders or antennas connected to this port are functioning well. The filter at each output port may send a signal to the connected RF component and receive a reflected signal from the component. The filter can then evaluate the replayed signal forward the status of the connected component to a central control unit (not shown) via the monitoring port 15 of the splitter.

In summary, in one aspect the present invention provides a system allowing to control the received and transmitted power from two antennas.

The invention claimed is:

1. A filter configured to filter a downlink signal of an antenna of an indoor cellular system, the filter comprising:
   a signal determining unit configured to determine a signal strength of an uplink signal received by said antenna, and to adjust a signal strength of the downlink signal of said antenna in accordance with the signal strength of the uplink signal; and
   an automatic load adjusting unit configured to automatically adjust a load of an output port to which said antenna is connected in accordance with the signal strength of the uplink signal received at said output port.

2. The filter of claim 1, further comprising a decoder configured to decode the uplink signal before the signal determining unit determines the signal strength of the uplink signal.

3. The filter of claim 1, further comprising a demodulator configured to determine a type of modulation of the uplink signal and to demodulate the uplink signal before the signal determining unit determines the signal strength of the uplink signal.

4. The filter of claim 1, further comprising a modulator configured to modulate the uplink signal for further transmission after the signal determining unit has determined the signal strength of the uplink signal.

5. The filter of claim 1, further comprising a coding unit configured to code the uplink signal for further transmission after the signal determining unit has determined the signal strength of the uplink signal.

6. The filter of claim 1, further comprising a band pass filter configured to filter the uplink signal before the signal determining unit determines the signal strength of the uplink signal.

7. The filter of claim 1, wherein the signal determining unit is configured to determine the signal strength of different uplink signals received by the antenna and to add the different uplink signals to determine the signal strength of a combined uplink signal, and wherein the filter is configured to adjust the signal strength of the downlink signal for said antenna in accordance with the signal strength of the combined uplink signal.

8. The filter of claim 7, wherein the signal determining unit is further configured to synchronize the different uplink signals received by the antenna before determining the signal strength of the combined uplink signal.

9. The filter of claim 1, wherein the signal determining unit is further configured to periodically transmit the signal strength of the uplink signal to the automatic load adjusting unit which adjusts the load in accordance with the periodically received signal strength of the uplink signal.

10. A method for filtering a downlink signal of an antenna of an indoor cellular system comprising the steps of:
    determining a signal strength of an uplink signal received by said antenna; and
    adjusting a signal strength of the downlink signal for said antenna in accordance with the signal strength of the uplink signal, wherein said adjusting comprises adapting a load of an output port to which said antenna is connected in accordance with the signal strength of the uplink signal received at said output port.

11. The method of claim 10, further comprising the step of decoding the uplink signal before the signal strength of the uplink signal is determined.

12. The method of claim 10, further comprising the step of determining a type of modulation applied to the uplink signal and demodulating the uplink signal before the signal strength of the uplink signal is determined.

13. The method of claim 10, further comprising the step of modulating the uplink signal for further transmission after the signal strength of the uplink signal has been determined.

14. The method of claim 10, further comprising the step of coding the uplink signal for further transmission after the signal strength of the uplink signal has been determined.

15. The method of claim 10, further comprising the steps of:
    determining the signal strength of different uplink signals received by said antenna; and
    combining the signal strengths of the different uplink signals to determine the signal strength of a combined uplink signal, wherein the signal strength of the downlink signal for said antenna is adjusted in accordance with a signal strength of the combined uplink signal.

16. The method of claim 15, further comprising the step of synchronizing the different uplink signals received by said antenna before the signal strength of the combined uplink signal is determined.

17. A splitter configured to distribute power to a plurality of antennas of an indoor cellular network, the splitter comprising:
    an input port receiving power;
    a plurality of output ports to which the received power is distributed, each output port being connected to an associated one of said plurality of antennas; and
    for at least one of the output ports, a filter configured to filter a downlink signal of its associated antenna, the filter comprising:
      a signal determining unit configured to determine a signal strength of an uplink signal received by its associated antenna, and to adjust a signal strength of the downlink signal of its associated antenna in accordance with the signal strength of the uplink signal; and
      an automatic load adjusting unit configured to automatically adjust a load of said at least one of the output ports to which the associated antenna is connected in accordance with the uplink signal strength received at said at least one of the output ports.

18. The splitter of claim 17, wherein each of the plurality of output ports of the splitter comprises one of the filters, with each filter being configured to determine the signal strength of the uplink signal of its associated antenna and to adjust the signal strength of the downlink signal of its associated antenna in accordance with the determined signal strength of the uplink signal of its associated antenna.

* * * * *

UNITED STATES PATENT AND TRADEMARK OFFICE
CERTIFICATE OF CORRECTION

| | | |
|---|---|---|
| PATENT NO. | : 8,666,345 B2 | Page 1 of 1 |
| APPLICATION NO. | : 13/265295 | |
| DATED | : March 4, 2014 | |
| INVENTOR(S) | : Soulhi et al. | |

It is certified that error appears in the above-identified patent and that said Letters Patent is hereby corrected as shown below:

In the Specification

In Column 1, Line 43, delete "base basis" and insert -- base --, therefor.

In Column 4, Line 33, delete "splitter to" and insert -- splitter 10 --, therefor.

In Column 4, Line 42, delete "splitter to" and insert -- splitter 10 --, therefor.

In Column 4, Line 49, delete "splitter to" and insert -- splitter 10 --, therefor.

In Column 4, Line 60, delete "splitter to" and insert -- splitter 10 --, therefor.

Signed and Sealed this
Eleventh Day of November, 2014

Michelle K. Lee
*Deputy Director of the United States Patent and Trademark Office*